UNITED STATES PATENT OFFICE.

OTTO BÜRSTENBINDER, OF HUMBOLDT, MICHIGAN.

IMPROVEMENT IN EXPLOSIVE COMPOUNDS.

Specification forming part of Letters Patent No. 190,954, dated May 22, 1877; application filed June 30, 1876.

*To all whom it may concern:*

Be it known that I, OTTO BÜRSTENBINDER, of Humboldt, in the county of Marquette and State of Michigan, have invented a new and useful Explosive Compound, of which the following is a full and correct description:

The nature of my invention consists in the preparation and use of spongy vegetable substances, such as cellulose compounded with glycocole or gelatine sugar, chondrin, saltpeter, and nitro-glycerine, and reduced to grains, all in the manner hereinafter more particularly set forth.

The following statement describes my process, and the explosive compound which results from it.

I employ vegetable substances of a soft, spongy, springy nature, like cellulose, which retain their natural elasticity, even after having been soaked in nitro-glycerine.

Those substances which I have found adapted to the purpose are cellulose, the pith of plants and trees, the pulp of fruits, fungi, vegetable excrescences, punk, and other soft, spongy, elastic, vegetable substances.

When such substances are dried till quite free from water, pulverized, and then inspissated with eight per cent. of glycocole, ($C^4H^4NO^3+H$,) or chondrin and saltpeter, in proportion to the amount of nitro-glycerine desired, they will, if mixed with from twenty to sixty per cent. of nitro-glycerine, produce an explosive compound greatly differing, in most of its qualities, from all hitherto-known "nitro-glycerine compounds."

The product resulting from the above process shows a tendency to coagulate, and is easily granulated by being passed through sieves and dried.

When in the granular form, temperature does not affect the nitro-glycerine contained in it.

The grains will neither freeze together at a temperature below zero, nor flow together or exude nitro-glycerine when heated to 200° Fahrenheit, while other nitro-glycerine compounds not containing glycocole or chondrin freeze hard at 45° Fahrenheit, and exude the nitro-glycerine at 75° Fahrenheit.

Notwithstanding the intimate union existing between the vegetable substance and the nitro-glycerine in this compound, the vegetable substance retains its original elasticity, and prevents the nitro-glycerine from exploding by concussion alone; and if crushed by hard blows on an anvil the compound will easily reform into grains, but not explode.

When ignited it will neither detonate nor explode, but will burn steadily with a brilliant white and yellow flame, radiating a very intense clear light. It will explode, however, if confined and tamped in a bore-hole, or loaded in the barrel of a gun, by the simple contact of fire—as, for instance, by the spark from a common fuse, or an ordinary percussion-cap.

Being in granular form, the decomposition into gases must necessarily be slower than that of nitro-glycerine, or any of its compounds, in a moist coherent mass—such as dynamite or dualin. Hence the rending-power peculiar to dynamite is modified into a more gradually operative force, and the compound is, consequently, applicable as a substitute for gunpowder for use in fire-arms.

It is packed for transportation in the common wooden powder-kegs, and is used exactly like common rifle or blasting powder.

The glycocole or gelatine sugar used in the manufacture of the above-described powder I prepare by boiling commercial glue in concentrated sulphuric acid of specific gravity 1.80. This solution I dilute with lukewarm water; boil slowly for eight or ten hours, till thick; neutralize the acid with chalk, and decant.

Having thus fully described my invention, I claim and desire to secure by Letters Patent—

1. The process herein described of preparing an explosive compound, which consists in inspissating vegetable substances with glycocole or chondrin and saltpeter, then soaking them in nitro-glycerine, and granulating and drying them, all in the manner described.

2. The explosive compound or powder herein described, consisting of vegetable substances, glycocole or chondrin and saltpeter, as specified.

In witness whereof I have hereunto set my hand this 23d day of June, 1876.

OTTO BÜRSTENBINDER.

In the presence of—
M. H. CROCKER,
W. S. CALHOUN.